United States Patent
Muta

(10) Patent No.: US 7,108,088 B2
(45) Date of Patent: Sep. 19, 2006

(54) HYBRID VEHICLE AND CONTROL METHOD OF HYBRID VEHICLE

(75) Inventor: Koichiro Muta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 301 days.

(21) Appl. No.: 10/870,471

(22) Filed: Jun. 18, 2004

(65) Prior Publication Data

US 2005/0016781 A1    Jan. 27, 2005

(30) Foreign Application Priority Data

Jul. 22, 2003    (JP) ............................. 2003-200034

(51) Int. Cl.
*B60K 6/00*    (2006.01)

(52) U.S. Cl. .................................. 180/65.2

(58) Field of Classification Search ............ 180/65.2, 180/65.3, 65.4, 243; 701/113, 22, 102, 115; 477/3

See application file for complete search history.

(56) References Cited

U.S. PATENT DOCUMENTS

| | | | |
|---|---|---|---|
| 5,991,683 A | 11/1999 | Takaoka et al. | |
| 2004/0006419 A1* | 1/2004 | Kimura | 701/101 |
| 2004/0108149 A1* | 6/2004 | Adachi et al. | 180/65.2 |
| 2004/0231627 A1* | 11/2004 | Kaita et al. | 123/179.3 |
| 2005/0016781 A1* | 1/2005 | Muta | 180/65.2 |
| 2005/0061562 A1* | 3/2005 | Mack | 180/65.2 |
| 2005/0082097 A1* | 4/2005 | Ichimoto et al. | 180/65.2 |
| 2005/0103544 A1* | 5/2005 | Takami et al. | 180/65.2 |
| 2005/0178594 A1* | 8/2005 | Yamauchi et al. | 180/65.2 |
| 2005/0187671 A1* | 8/2005 | Nada | 701/1 |
| 2005/0216176 A1* | 9/2005 | Ichimoto et al. | 701/112 |
| 2005/0229890 A1* | 10/2005 | Ichimoto et al. | 123/179.4 |
| 2005/0256632 A1* | 11/2005 | McGee et al. | 701/101 |
| 2006/0085120 A1* | 4/2006 | McGee et al. | 701/113 |
| 2006/0100056 A1* | 5/2006 | Yamauchi | 477/3 |
| 2006/0116797 A1* | 6/2006 | Moran | 701/22 |

FOREIGN PATENT DOCUMENTS

| | | |
|---|---|---|
| JP | 10-326115 | 12/1998 |
| JP | 2002-262401 | 9/2002 |

* cited by examiner

*Primary Examiner*—J. Allen Shriver
(74) *Attorney, Agent, or Firm*—Kenyon & Kenyon LLP

(57) ABSTRACT

The technique of the invention sets a compensated power Pa and updates a charge-discharge power demand Pb* with the setting of compensated power Pa, when a driving power demand Pr* set according to an observed accelerator opening Acc is not less than a lower correction limit P3, which is less than an engine stop criterion value P2, but is less than an upper correction limit P4, which is greater than the engine stop criterion value P2 but is less than an engine start criterion value P1 (steps S220 and S230). The technique then calculates an engine power demand Pe* from the updated charge-discharge power demand Pb* (step S240) and controls an engine and two motors. When the driving power demand Pr* is less than the lower correction limit P3, the technique stops operation of the engine (S150) and drives the hybrid vehicle with the power of the motor (steps S170 to S190). When the driving power demand Pr* is not less than the upper correction limit P4, the technique calculates the engine power demand Pe* without setting the compensated power Pa and controls the engine and two motors.

14 Claims, 8 Drawing Sheets

FNTYA022

HYBRID VEHICLE AND CONTROL METHOD OF HYBRID VEHICLE

BACKGROUND OF THE INVENTION

1. Field of the Invention

The present invention relates to a hybrid vehicle and a control method of the hybrid vehicle. More specifically the invention pertains to a hybrid vehicle equipped with an internal combustion engine and with a motor that is capable of outputting power to an axle, as well as to a control method of the hybrid vehicle.

2. Description of the Prior Art

A proposed hybrid vehicle has an engine, a planetary gear unit that includes a carrier linked with a crankshaft of the engine and a ring gear linked with a drive shaft mechanically connected to an axle, a first motor that inputs and outputs power from and to a sun gear of the planetary gear unit, a second motor that inputs and outputs power from and to the drive shaft, and a battery that supplies and receives electric power to and from the first motor and the second motor (see, for example, Japanese Patent Laid-Open Gazette No. 10-326115). This prior art hybrid vehicle specifies a driving power demand according to the observed accelerator opening and the observed vehicle speed, specifies a charge-discharge power according to the state of charge (SOC) of the battery, specifies a vehicle power demand based on the specified driving power demand and the specified charge-discharge power, and sets a required output from the engine. In the case of a small vehicle power demand, this prior art hybrid vehicle is driven with output of power from the second motor to the drive shaft connected to the axle while the engine is at a stop. In the case of a large vehicle power demand, on the other hand, the hybrid vehicle is driven while the engine is in operation and the power from the engine is subjected to torque conversion and is output to the drive shaft accompanied with charge and discharge of the battery.

SUMMARY OF THE INVENTION

Like the prior art hybrid vehicle of the above structure, the hybrid vehicle generally has a motor drive mode to drive with only the power from the motor and an engine drive mode to drive with the engine in operation. In such hybrid vehicles, a certain hysteresis is set for determination of start or stop of the engine. Especially in the structure of determining the start and the stop of the engine based on the vehicle power demand required for the vehicle, the switchover between start and stop of the engine may be repeated frequently in some driving conditions. The frequent switchover between charge and discharge of the battery and the frequent switchover between start and stop of the engine at a drive point of low efficiency undesirably lower the total energy efficiency of the hybrid vehicle.

The hybrid vehicle and its control method of the invention thus aim to prevent frequent switchover between start and stop of an internal combustion engine. The hybrid vehicle and its control method of the invention also aim to enhance the total energy efficiency of the hybrid vehicle.

In order to attain at least part of the above and the other related objects, the invention is directed to a hybrid vehicle and a control method of the hybrid vehicle as discussed below.

A hybrid vehicle of the invention is equipped with an internal combustion engine and with a motor that is capable of outputting power to an axle, and includes: a power generation system that utilizes at least part of power from the internal combustion engine to generate electric power; an accumulator that is chargeable and dischargeable to supply and receive electric power to and from the power generation system and the motor; and a controller including: a driving power demand setting module that sets a driving power demand in response to a driver's manipulation; a charge-discharge power setting module that sets a charge-discharge power to charge or discharge the accumulator according to a state of charge of the accumulator; a compensated power setting module that sets a compensated power according to the setting of driving power demand; a vehicle power demand setting module that sets a vehicle power demand required for the hybrid vehicle according to the setting of driving power demand, the setting of charge-discharge power, and the setting of compensated power; an operation-stop determination module that determines whether the internal combustion engine is in operation or at a stop, based on the setting of vehicle power demand; and a control module that controls the internal combustion engine, the power generation system, and the motor to output the vehicle power demand from the internal combustion engine and to output the driving power demand to the axle when the operation-stop determination module determines that the internal combustion engine is in operation, while controlling the internal combustion engine, the power generation system, and the motor to stop operation of the internal combustion engine and to output the driving power demand to the axle when the operation-stop determination module determines that the internal combustion engine is at a stop.

The hybrid vehicle of the invention sets the driving power demand in response to the driver's manipulation, sets the charge-discharge power to charge or discharge the accumulator according to the state of charge of the accumulator, and sets the compensated power according to the setting of driving power demand. The hybrid vehicle then sets the vehicle power demand required for the hybrid vehicle according to the setting of driving power demand, the setting of charge-discharge power, and the setting of compensated power, and determines whether the internal combustion engine is in operation or at a stop, based on the setting of vehicle power demand. When it is determined that the internal combustion engine is in operation, the internal combustion engine, a power generation system that utilizes at least part of power from the internal combustion engine to generate electric power, and the motor that is capable of outputting power to the axle are controlled to output the vehicle power demand from the internal combustion engine and to output the driving power demand to the axle. When it is determined that the internal combustion engine is at a stop, on the other hand, the internal combustion engine, the power generation system, and the motor are controlled to stop operation of the internal combustion engine and to output the driving power demand to the axle. The technique of the invention sets the vehicle power demand with the compensated power, which reflects the driving power demand, and determines the start or the stop of the internal combustion engine, based on the setting of vehicle power demand. The use of the compensated power desirably prevents frequent switchover between start and stop of the internal combustion engine and thereby enhances the total energy efficiency of the hybrid vehicle. When it is determined that the internal combustion engine is at a stop, the control of the internal combustion engine is carried out to maintain the operation stop state of the internal combustion engine, for example, to maintain the stop of fuel injection control.

In the hybrid vehicle of the invention, the operation-stop determination module may determine that the internal combustion engine is in operation when the vehicle power demand reaches a level of or over a preset first power and then keeps a level of or over a preset second power, which is less than the preset first power, while determining that the internal combustion engine is at a stop when the vehicle power demand reaches a level of less than the preset second power and then keeps a level of less than the preset first power, and the compensated power setting module may set the compensated power to make the vehicle power demand exceed the preset second power when the driving power demand is not less than a preset third power, which is less than the preset second power, in the case where the operation-stop determination module determines that the internal combustion engine is in operation, while setting the compensated power equal to zero in the case where the operation-stop determination module determines that the internal combustion engine is at a stop or when the driving power demand is less than the preset third power in the case where the operation-stop determination module determines that the internal combustion engine is in operation. In this case, the compensated power setting module may set the compensated power to make the vehicle power demand equal to a preset fourth power, which is greater than the preset second power but is less than the preset first power, when the driving power demand is not less than the preset third power, which is less than the preset second power, in the case where the operation-stop determination module determines that the internal combustion engine is in operation. Further, the compensated power setting module may set the compensated power to make the charge-discharge power not greater than a preset fifth power, when the driving power demand is not less than the preset third power in the case where the operation-stop determination module determines that the internal combustion engine is in operation.

In the hybrid vehicle of the invention, the vehicle power demand setting module may set the vehicle power demand, based on the setting of driving power demand and a greater between the setting of charge-discharge power and the setting of compensated power.

In the hybrid vehicle of the invention, the power generation system may be linked with an output shaft of the internal combustion engine and with a drive shaft connected to the axle and output at least part of power from the internal combustion engine to the drive shaft through input and output of electric power and mechanical power. In this case, the power generation system may include: a three-shaft power input-output assembly that is connected with three shafts, that is, the output shaft of the internal combustion engine, the drive shaft, and a third shaft, and specifies input and output of power from and to one residual shaft among the three shafts, based on powers input and output from and to two shafts among the three shafts; and a generator that inputs and outputs power from and to the third shaft. Further, the power generation system of the invention may include a generator having a first rotor, which is linked with the output shaft of the internal combustion engine, and a second rotor, which is linked with the drive shaft and rotates relative to the first rotor, and the generator outputs at least part of the power from the internal combustion engine to the drive shaft through input and output of electric power by electromagnetic interaction between the first rotor and the second rotor.

A control method of a hybrid vehicle of the invention is a control method of a hybrid vehicle equipped with an internal combustion engine, a motor that is capable of outputting power to an axle, a power generation system that utilizes at least part of power from the internal combustion engine to generate electric power, and an accumulator that is chargeable and dischargeable to supply and receive electric power to and from the power generation system and the motor, and the control method includes the steps of: (a) setting a driving power demand in response to a driver's manipulation; (b) setting a charge-discharge power to charge or discharge the accumulator according to a state of charge of the accumulator; (c) setting a compensated power according to the setting of driving power demand; (d) setting a vehicle power demand as a total power including the setting of driving power demand, the setting of charge-discharge power, and the setting of compensated power; (e) determining whether the internal combustion engine is in operation or at a stop, based on the setting of vehicle power demand; and (f) controlling the internal combustion engine, the power generation system, and the motor to output the vehicle power demand from the internal combustion engine and to output the driving power demand to the axle when it is determined in the step (e) that the internal combustion engine is in operation, while controlling the internal combustion engine, the power generation system, and the motor to stop operation of the internal combustion engine and to output the driving power demand to the axle when it is determined in the step (e) that the internal combustion engine is at a stop.

The control method of the hybrid vehicle of the invention sets the driving power demand in response to the driver's manipulation, sets the charge-discharge power to charge or discharge the accumulator according to the state of charge of the accumulator, and sets the compensated power according to the setting of driving power demand. The control method then sets the vehicle power demand required for the hybrid vehicle according to the setting of driving power demand, the setting of charge-discharge power, and the setting of compensated power, and determines whether the internal combustion engine is in operation or at a stop, based on the setting of vehicle power demand. When it is determined that the internal combustion engine is in operation, the internal combustion engine, a power generation system that utilizes at least part of power from the internal combustion engine to generate electric power, and the motor that is capable of outputting power to the axle are controlled to output the vehicle power demand from the internal combustion engine and to output the driving power demand to the axle. When it is determined that the internal combustion engine is at a stop, on the other hand, the internal combustion engine, the power generation sytem, and the motor are controlled to stop operation of the internal combustion engine and to output the driving power demand to the axle. The technique of the invention sets the vehicle power demand with the compensated power, which reflects the driving power demand, and determines the start or the stop of the internal combustion engine, based on the setting of vehicle power demand. The use of the compensated power desirably prevents frequent switchover between start and stop of the internal combustion engine and thereby enhances the total energy efficiency of the hybrid vehicle.

In the control method of the hybrid vehicle of the invention, the step (e) may determine that the internal combustion engine is in operation in the case where the vehicle power demand reaches a level of or over a preset first power and then keeps a level of or over a preset second power, which is less than the preset first power, while determining that the internal combustion engine is at a stop when the vehicle power demand reaches a level of less than the preset second power and then keeps a level of less than the preset first power, and the step (c) may set the compensated power to make the vehicle power demand exceed the preset second power when the driving power demand is not less than a preset third power, which is less than the preset second power, in the case where step (e) determines that the internal combustion engine is in operation, while setting the compensated power equal to zero in the case where the step (e) determines that the internal combustion engine is at a stop or when the driving power demand is less than the preset third power in the case where the step (e) determines that the internal combustion engine is in operation. In this case, the step (c) may set the compensated power to make the vehicle power demand equal to a preset fourth power, which is greater than the preset second power but is less than the preset first power, when the driving power demand is not less than the preset third power, which is less than the preset second power, in the case where the step (e) determines that the internal combustion engine is in operation. Further, the step (c) may set the compensated power to make the charge-discharge power not greater than a preset fifth power, when the driving power demand is not less than the preset third power in the case where the step (e) determines that the internal combustion engine is in operation.

In the control method of the hybrid vehicle of the invention, the step (b) may set the vehicle power demand, based on the setting of driving power demand and a greater between the setting of charge-discharge power and the setting of compensated power.

DESCRIPTION OF THE PREFERRED EMBODIMENTS

Figure 1:
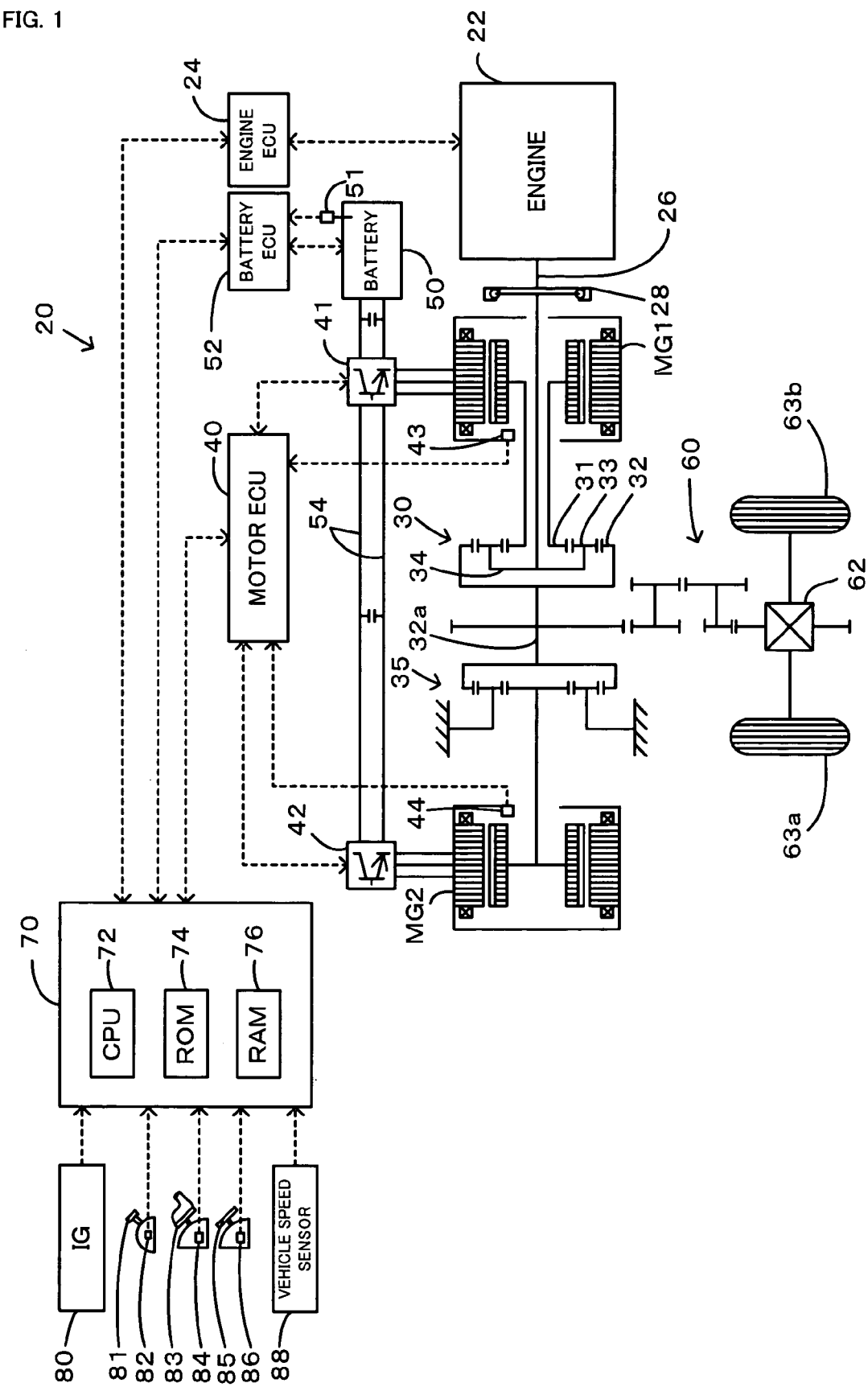
FIG. 1 schematically illustrates the construction of a hybrid vehicle 20 in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. said motor.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
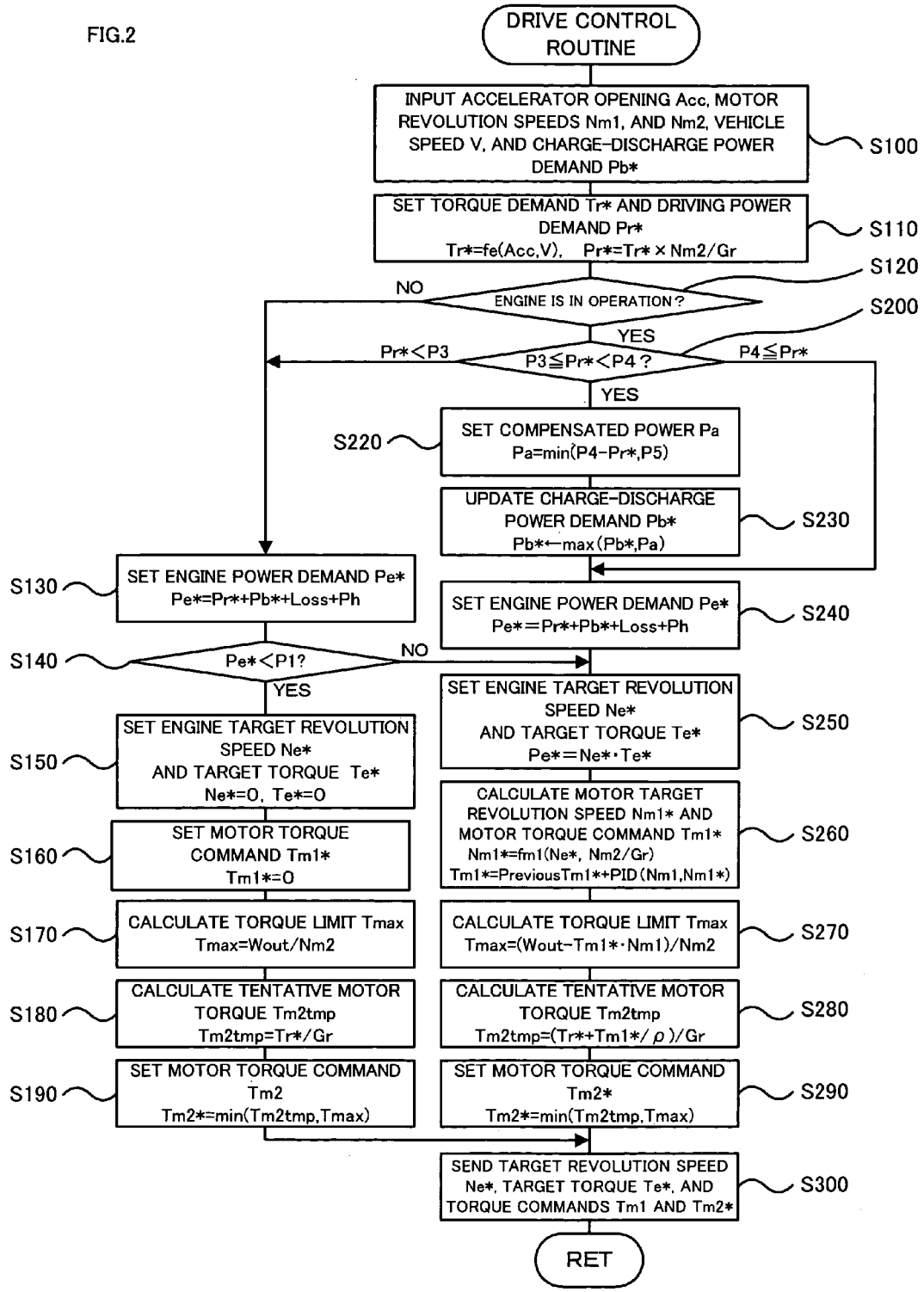
FIG. 2 is a flowchart showing a drive control routine executed by a hybrid electronic control unit 70.

The following describes the operations of the hybrid vehicle 20 of the embodiment constructed as discussed above, especially the operation to output a driving force to the ring gear shaft 32a or the drive shaft in response to the driver's step-on action of the accelerator pedal 83. FIG. 2 is a flowchart showing a drive control routine executed by the hybrid electronic control unit 70. This routine is carried out repeatedly at preset time intervals (for example, at every 8 msec).

When the drive control routine starts, the CPU 72 of the hybrid electronic control unit 70 first inputs various data required for control, that is, the accelerator opening Acc from the accelerator pedal position sensor 84, the vehicle speed V from the vehicle speed sensor 88, revolution speeds Nm1 and Nm2 of the motors MG1 and MG2, and a charge-discharge power demand Pb* of the battery 50 (step S100). The revolution speeds Nm1 and Nm2 of the motors MG1 and MG2 are computed from rotational positions of rotors in the motors MG1 and MG2 detected by rotational position detection sensors 43 and 44 and are input from the motor ECU 40 via communication. The charge-discharge power demand Pb* is specified by the battery ECU 52 according to a preset map and is input from the battery ECU 52 via communication. The preset map gives a greater discharging power with an increase in state of charge (SOC) of the battery 50 when the state of charge (SOC) is higher than a reference level, while giving a greater charging power with a decrease in state of charge (SOC) when the state of charge (SOC) is lower than the reference level.

Figure 3:
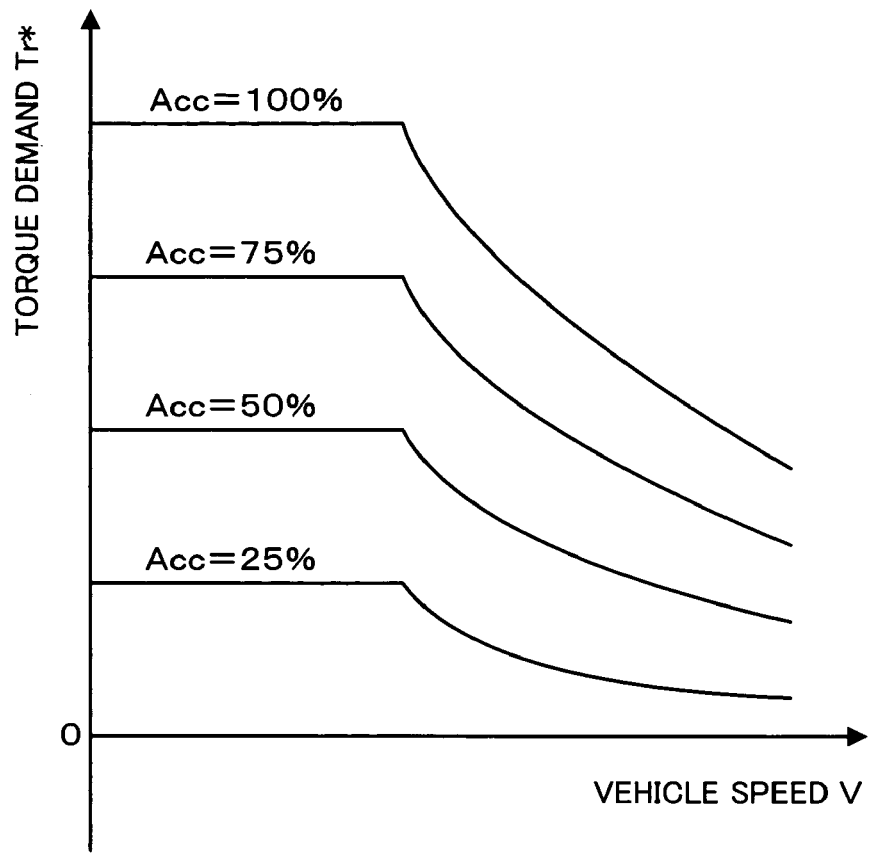
FIG. 3 shows an example of a torque demand setting map.

After the input of these data, the CPU 72 sets a torque demand Tr* to be output to the ring gear shaft 32a or the drive shaft linked with the drive wheels 63a and 63b as the torque required for the vehicle and a driving power demand Pr* as the driving power to be output to the ring gear shaft 32a, based on the inputs of the accelerator opening Acc and the vehicle speed V (step S110). In the structure of this embodiment, variations in torque demand Tr* against the accelerator opening Acc and the vehicle speed V are specified in advance and stored as a torque demand setting map in the ROM 74. The procedure of the embodiment reads and sets the torque demand Tr* corresponding to the given accelerator opening Acc and the given vehicle speed V from the stored torque demand setting map. FIG. 3 shows an example of the torque demand setting map. The driving power demand Pr* is calculated by multiplying the setting of the torque demand Tr* by a revolution speed Nr of the ring gear shaft 32a. The revolution speed Nr of the ring gear shaft 32a may be obtained by multiplying the vehicle speed V by a conversion coefficient k or by dividing the revolution speed Nm2 of the motor MG2 by a gear ratio Gr of the reduction gear 35.

Figure 4:
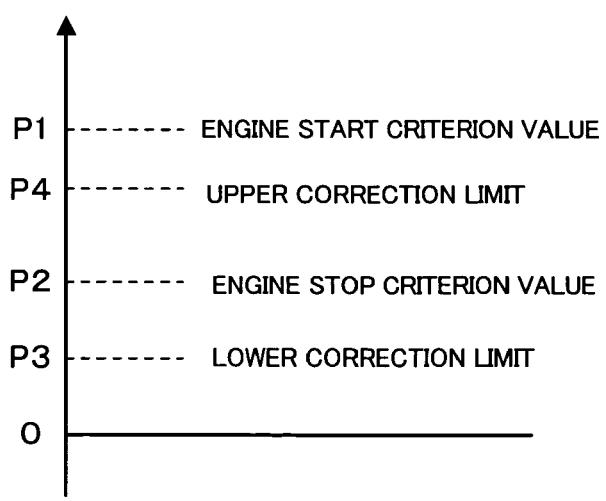
FIG. 4 shows a magnitude relation of reference values P1 to P4 used in one embodiment.

After setting the torque demand Tr* and the driving power demand Pr*, the CPU 72 determines whether the engine 22 is in operation or at a stop (step S120). When the engine 22 is at a stop, the CPU 72 sums up the driving power demand Pr*, the charge-discharge power demand Pb*, a potential loss 'Loss', and an auxiliary machinery power Ph to calculate an engine power demand Pe* to be output from the engine 22 as the power required for the vehicle (step S130), and compares the calculated engine power demand Pe* with an engine start criterion value P1 (step S140). FIG. 4 shows the magnitude relation of reference values P1 to P4 used in this embodiment. Here P2 denotes an engine stop criterion value, P3 denotes a lower limit of correction of the charge-discharge power demand Pb* (lower correction limit) to prevent frequent switchover between start and stop of the engine 22, and P4 denotes an upper limit of correction of the charge-discharge power demand Pb* (upper correction limit). P3 and P4 will be described in detail later. In the basic procedure of the embodiment, the engine 22 starts when the engine power demand Pe* exceeds the engine start criterion value P1 while the engine 22 is at a stop. The engine 22 stops when the engine power demand Pe* becomes lower than the engine stop criterion value P2 while the engine 22 is in operation.

When the engine power demand Pe* is lower than the engine start criterion value P1, the CPU 72 specifies no requirement of starting the engine 22 but selection of a motor drive mode to set the value '0' to a target revolution speed Ne* and a target torque Te* of the engine 22 and a torque command Tm1* of the motor MG1 (steps S150 and S160). The CPU 72 subsequently divides an output restriction Wout of the battery 50 by the current revolution speed Nm2 of the motor MG2 according to Equation (1) given below to calculate a torque limit Tmax as an upper limit torque output from the motor MG2 (step S170). The CPU 72 also divides the torque demand Tr* by the gear ratio Gr of the reduction gear 35 according to Equation (2) given below to calculate a tentative motor torque Tm2tmp as a torque to be output from the motor MG2 (step S180), and sets the smaller between the calculated torque limit Tmax and the calculated tentative motor torque Tm2tmp to a torque command Tm2* of the motor MG2 (step S190). Setting the torque command Tm2* of the motor MG2 in this manner enables the torque demand Tr*, which is to be output to the ring gear shaft 32a or the drive shaft, to be set as a limited torque within the range of the output restriction of the battery 50.

$$Tmax = Wout/Nm2 \quad (1)$$

$$Tm2\ tmp = Tr^*/Gr \quad (2)$$

Figure 5:
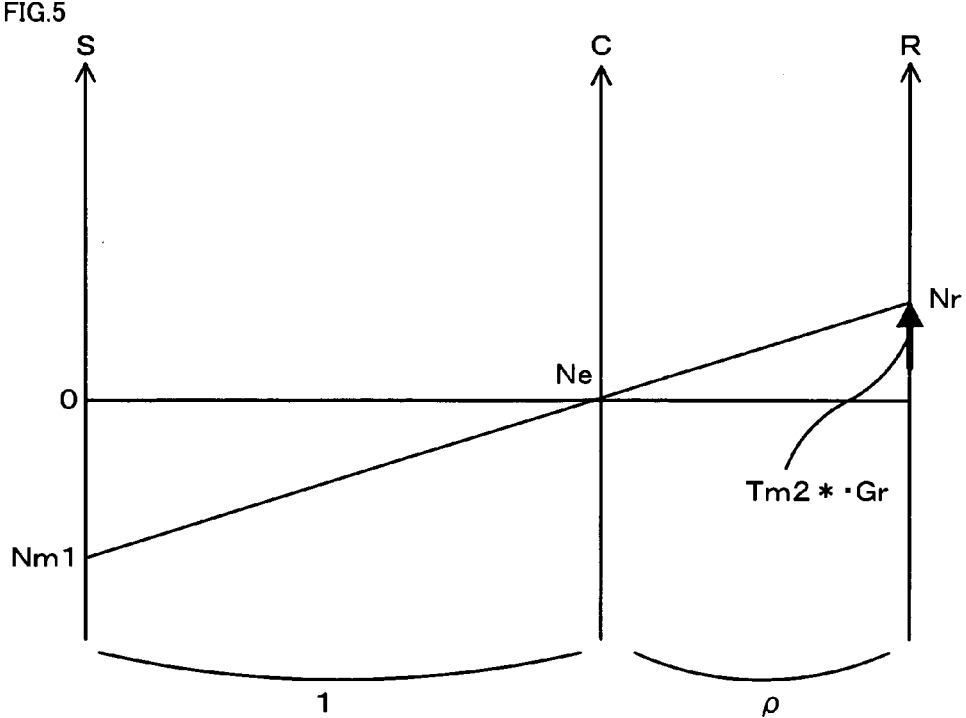
FIG. 5 is an alignment chart showing a dynamic relation with respect to rotational elements in a power distribution integration mechanism 30 in a motor drive mode.

After setting the target revolution speed Ne* and the target torque Te* of the engine 22 and the torque commands Tm1* and Tm2* of the motors MG1 and MG2, the CPU 72 sends the target revolution speed Ne* and the target torque Te* of the engine 22 to the engine ECU 24 and the torque commands Tm1* and Tm2* of the motors MG1 and MG2 to the motor ECU 40 (step S300) and exits from this drive control routine. The engine ECU 24 receives the target revolution speed Ne* and the target torque Te*, which are both set equal to 0, and maintains the current engine stop state when the engine 22 is at a stop. When the engine 22 is in operation, on the other hand, the engine ECU 24 stops fuel injection control and ignition control to stop the operation of the engine 22. The motor ECU 40 receives the torque commands Tm1* and Tm2* and carries out switching control of six switching elements in the inverter 41 to set the torque of the motor MG1 equal to 0, while carrying out switching control of six switching elements in the inverter 42 to ensure output of a torque corresponding to the torque command Tm2* from the motor MG2. Such control enables a torque corresponding to the torque demand Tr* to be output from the motor MG2 to the ring gear shaft 32a in the range of the output restriction Wout of the battery 50, while the engine 22 is at a stop. At this moment, the friction torque of the engine 22 is greater than the torque of the motor MG1, so that the motor MG1 is rotated according to the gear ratio ρ of the power distribution integration mechanism 30. FIG. 5 is an alignment chart showing a relation between the revolution speed and the torque with respect to the rotational elements in the power distribution integration mechanism 30 in the motor drive mode. An axis S shows the revolution speed of the sun gear 31 that is equal to the revolution speed Nm1 of the motor MG1. An axis C shows the revolution speed of the carrier 34 that is equal to the revolution speed Ne of the engine 22. An axis R shows the revolution speed Nr of the ring gear 32 that is obtained by multiplying the revolution speed Nm2 of the motor MG2 by the gear ratio Gr of the reduction gear 35.

Figure 6:
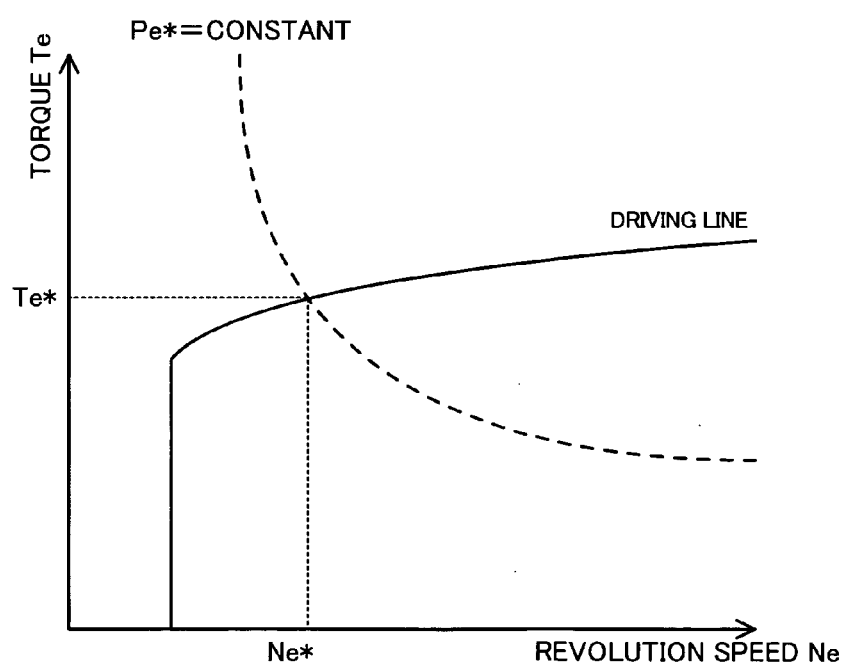
FIG. 6 shows an example of a driving line of an engine 22 and a process of setting a target revolution speed Ne* and a target torque Te*.

When it is determined at step S140 that the engine power demand Pe* is not lower than the engine start criterion value P1, on the other hand, the CPU 72 sets the target revolution speed Ne* and the target torque Te* of the engine 22, based on the setting of the engine power demand Pe* (step S250). Here the target revolution speed Ne* and the target torque Te* are set according to a driving line for efficiently driving the engine 22 and the setting of the engine power demand Pe*. An example of the driving line of the engine 22 and the process of setting the target revolution speed Ne* and the target torque Te* are shown in FIG. 6. As illustrated, the target revolution speed Ne* and the target torque Te* are obtained as the intersection of the driving line and a curve of constant engine power demand Pe* (=Ne*×Te*).

Figure 7:
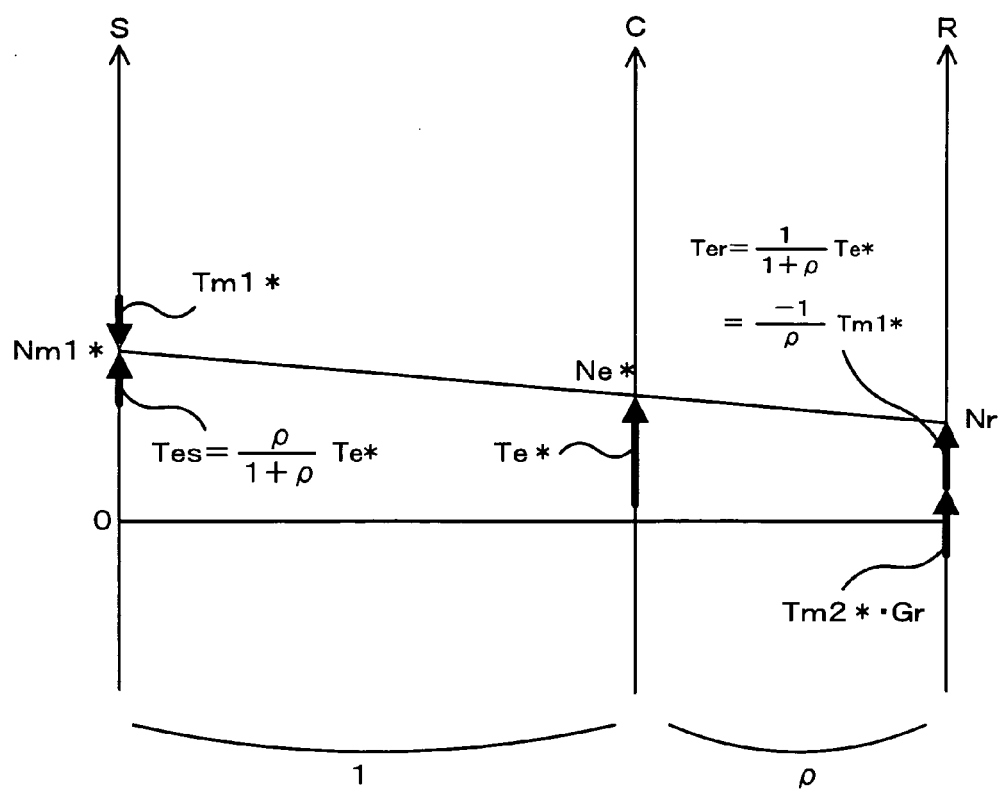
FIG. 7 is an alignment chart showing dynamic relation with respect to the rotational elements in the power distribution mechanism 30 in a torque conversion drive mode and a charge-discharge drive mode.

The CPU 72 subsequently calculates a target revolution speed Nm1* of the motor MG1 from the setting of the target revolution speed Ne*, the revolution speed Nr (=Nm2/Gr) of the ring gear shaft 32a, and the gear ratio ρ of the power distribution integration mechanism 30 according to Equation (3) given below, and calculates the torque command Tm1* of the motor MG1 from the calculated target revolution speed Nm1* and the current revolution speed Nm1 of the motor MG1 according to Equation (4) given below (step S260). Equation (3) shows a dynamic relation of the rotational elements in the power distribution integration mechanism 30. FIG. 7 is an alignment chart showing a dynamic relation between the revolution speed and the torque with respect to the rotational elements in the power distribution integration mechanism 30. Equation (3) is easily derived from this alignment chart. Two thick arrows on the axis R respectively represent a torque acting on the ring gear shaft 32a as the torque Te* output from the engine 22 is transmitted via the power distribution integration mechanism 30 while the engine 22 is steadily driven at a specific drive point defined by the target torque Te* and the target revolution speed Ne*, and a torque acting on the ring gear shaft 32a as the torque Tm2* output from the motor MG2 is transmitted via the reduction gear 35. Equation (4) shows a relation in feedback control to rotate the motor MG1 at the target revolution speed Nm1*. In Equation (4), 'k1' in the second term on the right side represents a gain of a proportional term and 'k2' in the third term on the right side represents a gain of an integral term.

$$Nm1^* = Ne^* \cdot (1+\rho)/\rho - Nm2/(Gr \cdot \rho) \quad (3)$$

$$Tm1^* = \text{Previous } Tm1^* + k1(Nm1^* - Nm1) + k2 \int (Nm1^* - Nm1)dt \quad (4)$$

After calculation of the target revolution speed Nm1* and the torque command Tm1* of the motor MG1, the CPU 72 divides a difference between the output restriction Wout of the battery 50 and a power consumption (generated power) of the motor MG1, which is the product of the calculated torque command Tm1* of the motor MG1 and the current revolution speed Nm1 of the motor MG1, by the current revolution speed Nm2 of the motor MG2 according to Equation (5) given below to calculate the torque limit Tmax as the upper limit torque output from the motor MG2 (step S270). The CPU 72 also calculates the tentative motor torque Tm2tmp as the torque to be output from the motor MG2 from the torque demand Tr*, the torque command Tm1*, and the gear ratio ρ of the power distribution integration mechanism 30 according to Equation (6) given below (step S280), and sets the smaller between the calculated torque limit Tmax and the calculated tentative motor torque Tm2tmp to the torque command Tm2* of the motor MG2 (step S290) Setting the torque command Tm2* of the motor MG2 in this manner enables the torque demand Tr*, which is to be output to the ring gear shaft 32a or the drive shaft, to be set as the limited torque within the range of the output restriction of the battery 50. Equation (6) is easily derived from the alignment chart of FIG. 7 discussed above.

$$T\text{max} = (W\text{out} - Tm1^* \cdot Nm1)/Nm2 \quad (5)$$

$$Tm2tmp = (Tr^* + Tm1^*/\rho)/Gr \quad (6)$$

After setting the target revolution speed Ne* and the target torque Te* of the engine 22 and the torque commands Tm1* and Tm2* of the motors MG1 and MG2, the CPU 72 sends the target revolution speed Ne* and the target torque Te* of the engine 22 to the engine ECU 24 and the torque commands Tm1* and Tm2* of the motors MG1 and MG2 to the motor ECU 40 (step S300) and exits from this drive control routine. The engine ECU 24 receives the target revolution speed Ne* and the target torque Te*, starts the engine 22, and carries out fuel injection control and ignition control to drive the engine 22 at a drive point defined by the target revolution speed Ne* and the target torque Te*. The motor ECU 40 receives the torque commands Tm1* and Tm2* and carries out switching control of the switching elements in the inverters 41 and 42 to drive the motor MG1 with the torque command Tm1* and to drive the motor MG2 with the torque command Tm2*.

When it is determined at step S120 that the engine 22 is in operation, it is subsequently determined whether the driving power demand Pr* is not lower than the lower correction limit P3 but is lower than the upper correction limit P4 (step S200). When the driving power demand Pr* is lower than the lower correction limit P3, the CPU 72 executes the processing of and after step S130 discussed previously, so as to stop the operation of the engine 22 and effectuate the motor drive mode.

When the driving power demand Pr* is not lower than the lower correction limit P3 but is lower than the upper correction limit P4, the CPU 72 sets the smaller between a value obtained by subtracting the driving power demand Pr* from the upper correction limit P4 and a charge limit P5 to a compensated power Pa (step S220), while setting the greater between the current charge-discharge power demand Pb* and the setting of the compensated power Pa to the updated charge-discharge power demand Pb* (step S230). The method of setting the compensated power Pa takes into account the subtraction of the driving power demand Pr* from the upper correction limit P4 and the charge limit P5. The former causes the sum of the updated charge-discharge power demand Pb* and the driving power demand Pr* to be not excessive and to be not higher than the upper correction limit P4. The latter prevents an excessive value from being set to the charge-discharge power demand Pb*. The charge limit P5 may be any value that is lower than an upper limit of chargeable power of the battery 50. After the update of the charge-discharge power demand Pb*, the CPU 72 sums up the driving power demand Pr*, the charge-discharge power demand Pb*, the potential loss 'Loss', and the auxiliary machinery power Ph to calculate the engine power demand Pe* to be output from the engine 22 as the power required for the vehicle (step S240). The program then executes the processing of and after step S250 and exits from this drive control routine. When the driving power demand Pr* is not lower than the lower correction limit P3 but is lower than the upper correction limit P4, the charge-discharge power demand Pb* is updated according to the driving power demand Pr* to continue the operation of the engine 22. This arrangement effectively prevents frequent switchover between start and stop of the engine 22.

When it is determined at step S200 that the driving power demand Pr* is not lower than the upper correction limit P4, there is no need to update the charge-discharge power demand Pb*. The program accordingly executes the processing of and after step S240 and exits from this drive control routine.

Figure 8:
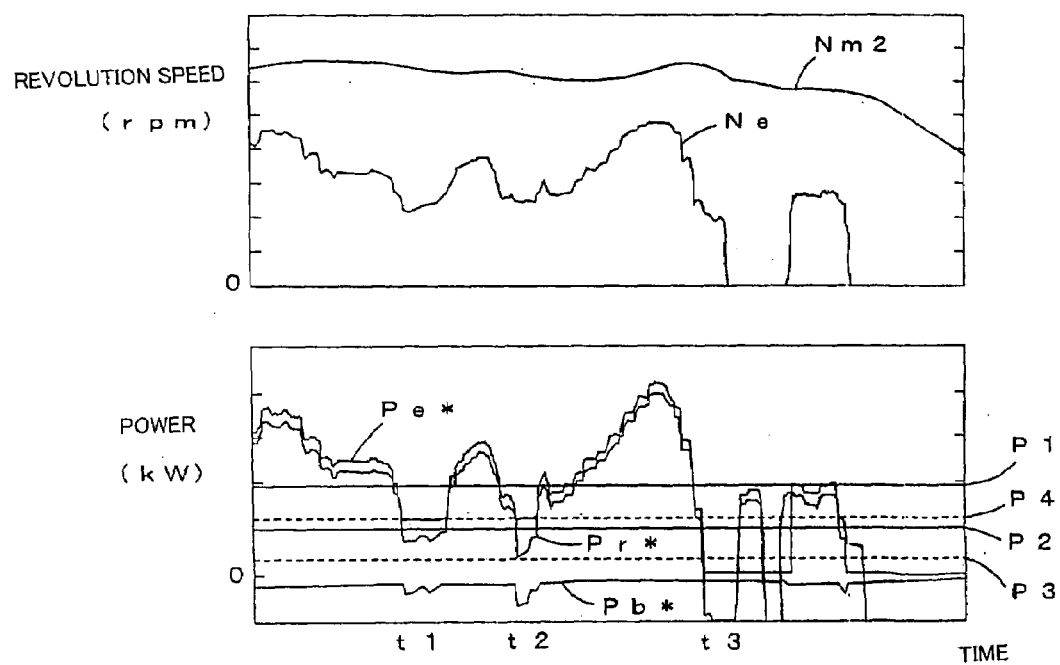
FIG. 8 shows one example of variations in revolution speed Nm2 of the motor MG2, revolution speed Ne of the engine 22, driving power demand Pr*, engine power demand Pe*, and charge-discharge power demand Pb* with elapse of time.

FIG. 8 shows one example of variations in revolution speed Nm2 of the motor MG2, revolution speed Ne of the engine 22, driving power demand Pr*, engine power demand Pe*, and charge-discharge power demand Pb* with elapse of time. The driving power demand Pr* is lower than the engine stop criterion value P2 but is not lower than the lower correction limit P3 at and about a time point t1 and at and about a time point t2. The procedure thus sets the compensated power Pa and updates the charge-discharge power demand Pb* with the setting of the compensated power Pa. This sets the engine power demand Pe*, which is close to the upper correction limit P4 greater than the engine stop criterion value P2, to continue the operation of the engine 22. At and about a time point t3, the driving power demand Pr* is lower than the lower correction limit P3. The procedure thus does not update the charge-discharge power demand Pb* and stops the operation of the engine 22. A delay of a decrease in revolution speed Ne of the engine 22 is ascribed to some time difference elapsing before an actual stop of the engine 22. The hybrid vehicle 20 continues driving over the above time, as clearly understood from the variation in revolution speed Nm2 of the motor MG2.

As described above, the hybrid vehicle 20 of the embodiment sets the compensated power Pa according to the driving power demand Pr* and updates the charge-discharge power demand Pb* with the setting of this compensated power Pa. This arrangement effectively prevents frequent switchover between start and stop of the engine 22. The hybrid vehicle 20 of the embodiment has the enhanced total energy efficiency, compared with the prior art hybrid vehicle that repeats start and stop of the engine frequently. The compensated power Pa is restricted by the charge limit P5. This arrangement effectively prevents an excessive value from being set to the charge-discharge power demand Pb* and thereby prevents the battery 50 from being charged with the excessive charge-discharge power demand Pb*. The hybrid vehicle 20 of the embodiment is driven with output of the driving power demand Pr* required by the driver to the ring gear shaft 32a or the drive shaft.

The hybrid vehicle 20 of the embodiment sets the compensated power Pa when the driving power demand Pr* is not lower than the lower correction limit P3 but is lower than the upper correction limit P4. One modified procedure may set the compensated power Pa even when the driving power demand Pr* is not lower than the upper correction limit P4 as long as not lower than the lower correction limit P3.

The hybrid vehicle 20 of the embodiment sets the smaller between the value obtained by subtracting the driving power demand Pr* from the upper correction value P4 and the charge limit P5 to the compensated power Pa. Diversity of other techniques may be adopted to set the compensated power Pa. For example, the compensated power Pa may be set to decrease with an increase in driving power demand Pr*.

The hybrid vehicle 20 of the embodiment 20 sets the compensated power Pa and updates the charge-discharge power demand Pb* with the setting of this compensated power Pa. One modified procedure may update the engine power demand Pe* with the setting of the compensated power Pa. In the latter case, the engine power demand Pe* is calculated as the sum of the driving power demand Pr*, the charge-discharge power demand Pb*, the compensated power Pa, the potential loss 'Loss', and the auxiliary machinery power Ph.

Figure 9:
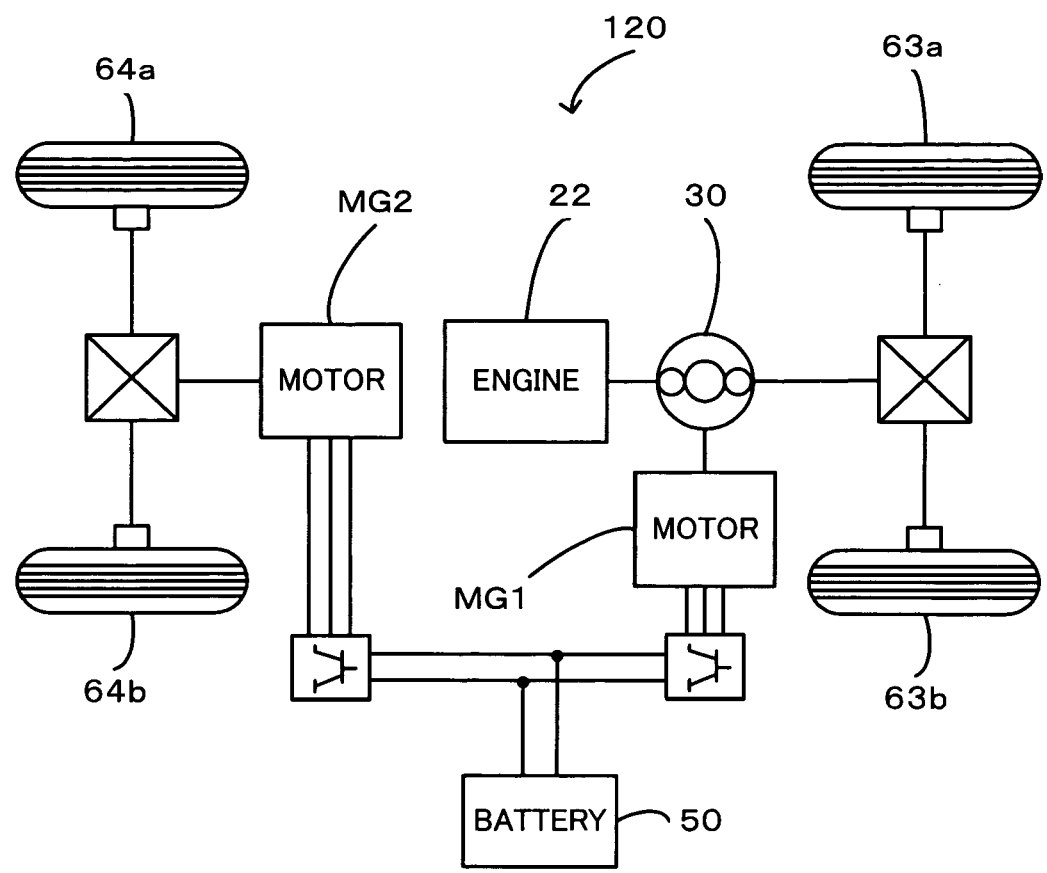
FIG. 9 schematically illustrates the construction of a hybrid vehicle 120 in one modified embodiment.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 9, the power of the motor MG2 may be output to another axle (that is, an axle linked with wheels 64a and 64b), which is different from an axle connected with the ring gear shaft 32a (that is, an axle linked with the wheels 63a and 63b).

Figure 10:
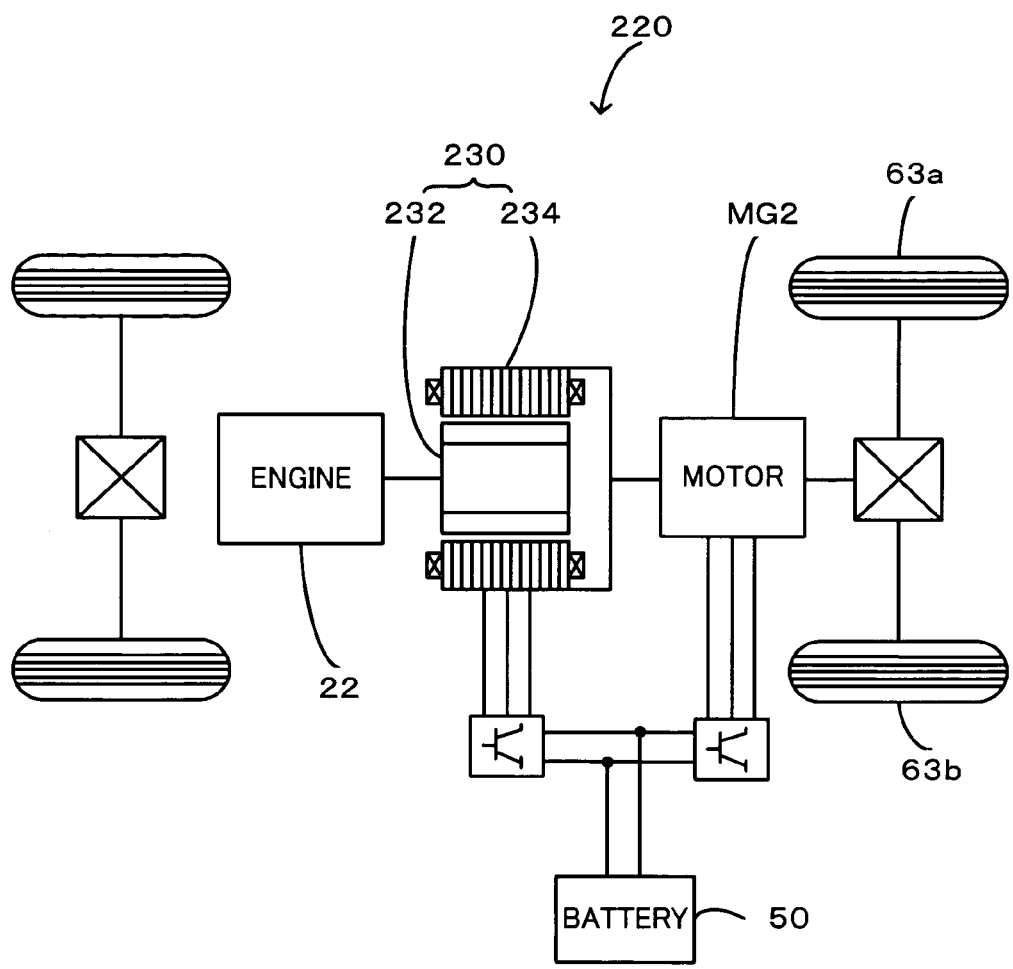
FIG. 10 schematically illustrates the construction of a hybrid vehicle 220 in another modified embodiment.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 10, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

What is claimed is:

1. A hybrid vehicle equipped with an internal combustion engine and with a motor that is capable of outputting power to an axle, said hybrid vehicle comprising:
    a power generation system that utilizes at least part of power from said internal combustion engine to generate electric power;
    an accumulator that is chargeable and dischargeable to supply and receive electric power to and from said power generation system and said motor; and
    a controller comprising: a driving power demand setting module that sets a driving power demand in response to a driver's manipulation; a charge-discharge power setting module that sets a charge-discharge power to charge or discharge said accumulator according to a state of charge of said accumulator; a compensated power setting module that sets a compensated power according to the setting of driving power demand; a vehicle power demand setting module that sets a vehicle power demand required for said hybrid vehicle according to the setting of driving power demand, the setting of charge-discharge power, and the setting of compensated power; an operation-stop determination module that determines whether said internal combustion engine is in operation or at a stop, based on the setting of vehicle power demand; and a control module that controls said internal combustion engine, said power generation system, and said motor to output the vehicle power demand from said internal combustion engine and to output the driving power demand to said axle when said operation-stop determination module determines that said internal combustion engine is in operation, while controlling said internal combustion engine, said power generation system, and said motor to stop operation of said internal combustion engine and to output the driving power demand to said axle when said operation-stop determination module determines that said internal combustion engine is at a stop.

2. A hybrid vehicle in accordance with claim 1, wherein said operation-stop determination module determines that said internal combustion engine is in operation when the vehicle power demand reaches a level of or over a preset first power and then keeps a level of or over a preset second power, which is less than the preset first power, while determining that said internal combustion engine is at a stop when the vehicle power demand reaches a level of less than the preset second power and then keeps a level of less than the preset first power, and
    said compensated power setting module sets the compensated power to make the vehicle power demand exceed the preset second power when the driving power demand is not less than a preset third power, which is less than the preset second power, in the case where said operation-stop determination module determines that said internal combustion engine is in operation, while setting the compensated power equal to zero in the case where said operation-stop determination module determines that said internal combustion engine is at a stop or when the driving power demand is less than the preset third power in the case where said operation-stop determination module determines that said internal combustion engine is in operation.

3. A hybrid vehicle in accordance with claim 2, wherein said compensated power setting module sets the compensated power to make the vehicle power demand equal to a preset fourth power, which is greater than the preset second power but is less than the preset first power, when the driving power demand is not less than the preset third power, which is less than the preset second power, in the case where said operation-stop determination module determines that said internal combustion engine is in operation.

4. A hybrid vehicle in accordance with claim 3, wherein said compensated power setting module sets the compensated power to make the charge-discharge power not greater than a preset fifth power, when the driving power demand is not less than the preset third power in the case where said operation-stop determination module determines that said internal combustion engine is in operation.

5. A hybrid vehicle in accordance with claim 1, wherein said vehicle power demand setting module sets the vehicle power demand, based on the setting of driving power demand and a greater between the setting of charge-discharge power and the setting of compensated power.

6. A hybrid vehicle in accordance with claim 1, wherein said power generation system is linked with an output shaft of said internal combustion engine and with a drive shaft connected to said axle and outputs at least part of power from said internal combustion engine to said drive shaft through input and output of electric power and mechanical power.

7. A hybrid vehicle in accordance with claim 6, wherein said power generation system comprises:
  a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and
  a generator that inputs and outputs power from and to said third shaft.

8. A hybrid vehicle in accordance claim 6, wherein said power generation system comprises a generator having a first rotor, which is linked with the output shaft of said internal combustion engine, and a second rotor, which is linked with said drive shaft and rotates relative to the first rotor, said generator outputting at least part of the power from said internal combustion engine to said drive shaft through input and output of electric power by electromagnetic interaction between the first rotor and the second rotor.

9. A hybrid vehicle equipped with an internal combustion engine and with a motor that is capable of outputting power to an axle, said hybrid vehicle comprising:
  a power generation module that utilizes at least part of power from said internal combustion engine to generate electric power;
  an electric accumulation module that is chargeable and dischargeable to supply and receive electric power to and from said power generation module and said motor;
  a driving power demand setting module that sets a driving power demand in response to a driver's manipulation;
  a charge-discharge power setting module that sets a charge-discharge power to charge or discharge said electric accumulation module according to a state of charge of said electric accumulation module;
  a compensated power setting module that sets a compensated power according to the setting of driving power demand;
  a vehicle power demand setting module that sets a vehicle power demand required for said hybrid vehicle according to the setting of driving power demand, the setting of charge-discharge power, and the setting of compensated power;
  an operation-stop determination module that determines whether said internal combustion engine is in operation or at a stop, based on the setting of vehicle power demand; and
  a control module that controls said internal combustion engine, said power generation module, and said motor to output the vehicle power demand from said internal combustion engine and to output the driving power demand to said axle when said operation-stop determination module determines that said internal combustion engine is in operation, while controlling said internal combustion engine, said power generation module, and said motor to stop operation of said internal combustion engine and to output the driving power demand to said axle when said operation-stop determination module determines that said internal combustion engine is at a stop.

10. A control method of a hybrid vehicle, said hybrid vehicle being equipped with an internal combustion engine, a motor that is capable of outputting power to an axle, a power generation system that utilizes at least part of power from said internal combustion engine to generate electric power, and an accumulator that is chargeable and dischargeable to supply and receive electric power to and from said power generation system and said motor,
  said control method comprising the steps of:
  (a) setting a driving power demand in response to a driver's manipulation;
  (b) setting a charge-discharge power to charge or discharge said accumulator according to a state of charge of said accumulator;
  (c) setting a compensated power according to the setting of driving power demand;
  (d) setting a vehicle power demand as a total power including the setting of driving power demand, the setting of charge-discharge power, and the setting of compensated power;
  (e) determining whether said internal combustion engine is in operation or at a stop, based on the setting of vehicle power demand; and
  (f) controlling said internal combustion engine, said power generation system, and said motor to output the vehicle power demand from said internal combustion engine and to output the driving power demand to said axle when it is determined in said step (e) that said internal combustion engine is in operation, while controlling said internal combustion engine, said power generation system, and said motor to stop operation of said internal combustion engine and to output the driving power demand to said axle when it is determined in said step (e) that said internal combustion engine is at a stop.

11. A control method of a hybrid vehicle in accordance with claim 10, wherein said step (e) determines that said internal combustion engine is in operation in the case where the vehicle power demand reaches a level of or over a preset first power and then keeps a level of or over a preset second power, which is less than the preset first power, while determining that said internal combustion engine is at a stop when the vehicle power demand reaches a level of less than the preset second power and then keeps a level of less than the preset first power, and
  said step (c) sets the compensated power to make the vehicle power demand exceed the preset second power when the driving power demand is not less than a preset third power, which is less than the preset second power, in the case where step (e) determines that said internal combustion engine is in operation, while setting the compensated power equal to zero in the case where said step (e) determines that said internal combustion engine is at a stop or when the driving power demand is less than the preset third power in the case where said step (e) determines that said internal combustion engine is in operation.

12. A control method of a hybrid vehicle in accordance with claim 11, wherein said step (c) sets the compensated power to make the vehicle power demand equal to a preset fourth power, which is greater than the preset second power but is less than the preset first power, when the driving power demand is not less than the preset third power, which is less than the preset second power, in the case where said step (e) determines that said internal combustion engine is in operation.

13. A control method of a hybrid vehicle in accordance with claim 12, wherein said step (c) sets the compensated power to make the charge-discharge power not greater than a preset fifth power, when the driving power demand is not less than the preset third power in the case where said step (e) determines that said internal combustion engine is in operation.

14. A control method of a hybrid vehicle in accordance with claim 10, wherein said step (b) sets the vehicle power demand, based on the setting of driving power demand and a greater between the setting of charge-discharge power and the setting of compensated power.

* * * * *